United States Patent [19]

Abramson

[11] 4,205,917
[45] Jun. 3, 1980

[54] METHOD OF UTILIZING INTERFEROMETRIC INFORMATION FROM TWO DIFFERENT HOLOGRAMS EXPOSED WITH SHORT INTERVAL

[76] Inventor: Nils Abramson, 52 Valhallavägen, Stockholm, Sweden, S-114 22

[21] Appl. No.: 874,596

[22] Filed: Feb. 2, 1978

[30] Foreign Application Priority Data

Mar. 2, 1977 [SE] Sweden .............................. 7701188

[51] Int. Cl.² .............................................. G01B 9/02
[52] U.S. Cl. .................................................. 356/347
[58] Field of Search ............... 356/347, 348; 350/3.75, 350/3.77, 3.78, 3.79, 3.8

[56] References Cited

U.S. PATENT DOCUMENTS

| | | | |
|---|---|---|---|
| 3,606,517 | 9/1971 | Jacobson et al. | 350/3.8 X |
| 3,627,916 | 12/1971 | Bestenreiner et al. | 350/3.79 X |

Primary Examiner—John K. Corbin
Assistant Examiner—Matthew W. Koren
Attorney, Agent, or Firm—Schuyler, Birch, McKie & Beckett

[57] ABSTRACT

The present invention is directed to a holographic interferometer for measuring the deformation of an object or mechanical structure by exposing one or more hologram plates to a light source and a reference beam. In particular, the invention is directed to a method and apparatus for moving the hologram plate during and between exposures to thereby obtain exposures on different portions of the hologram plate. Each of these different exposures is taken in a short time interval in response to light reflected by the object from the light source as well as light from the reference beam. The image on the hologram plates is then reconstructed in a manner generally known in the art to determine the deformation of the object or mechanical structure. In order to obtain these exposures on different portions of the hologram plates, a screen having one or more apertures is positioned in front of the hologram plates to restrict the size of the short time interval exposures on the hologram plates. The hologram plates are continuously rotated prior to and during the exposures about an axis of rotation which is located perpendicularly to the surface of the hologram plates and is positioned so that some portion of the hologram plates is always located behind the aperture in the screen. In order to obtain a suitable direction of the interference lines, the reference beam, the aperture in the screen, the object and the axis of rotation of the hologram plates are positioned in the same plane. In the preferred embodiment, two different hologram plates are rotated together behind the screen. During reconstruction, these different hologram plates are positioned adjacent one another so that the surfaces of the forward hologram plate exposed by the first exposure pulse cover the surfaces of the rearward hologram plate exposed by the second exposure pulse, or vice versa. As a result, the interference lines in the hologram image correspond to the object or mechanical structure which is being measured for deformation.

13 Claims, 3 Drawing Figures

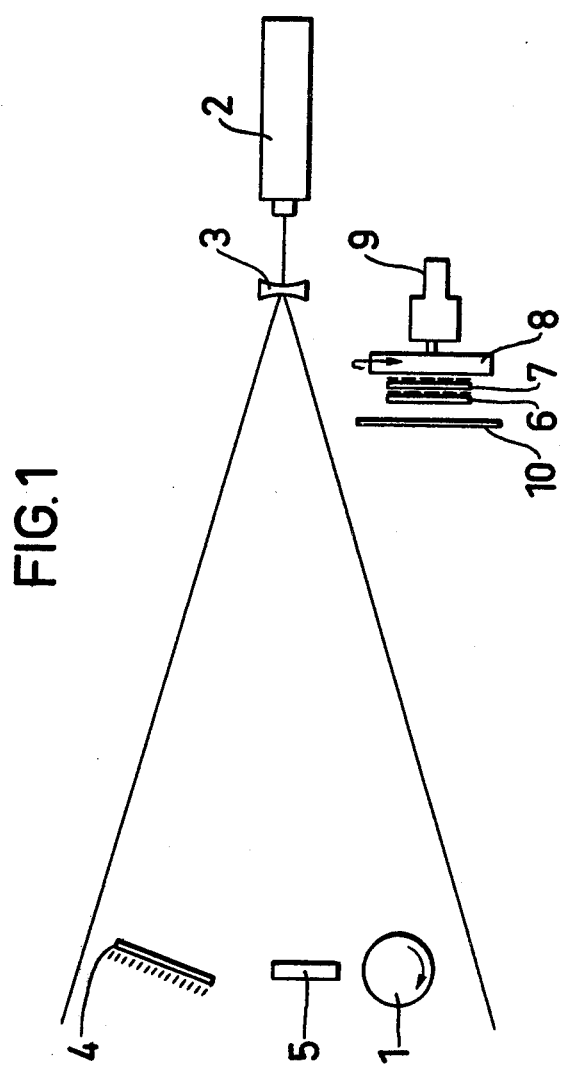

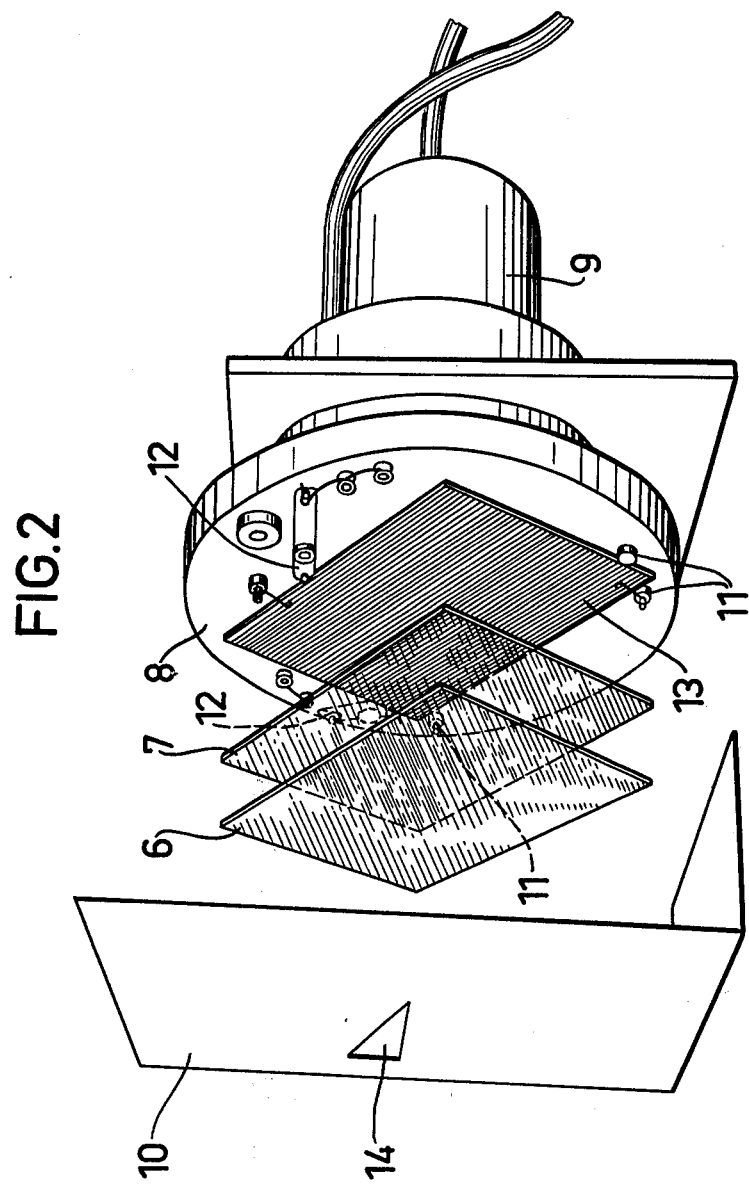

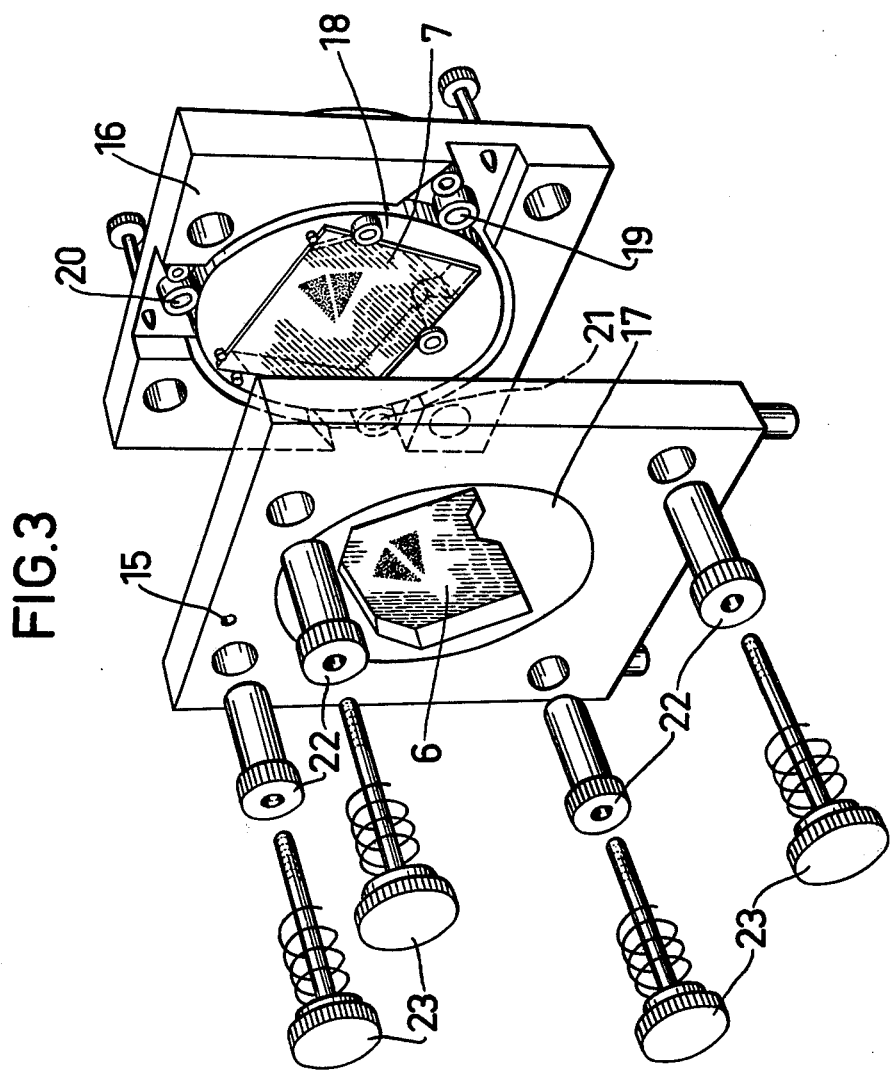

METHOD OF UTILIZING INTERFEROMETRIC INFORMATION FROM TWO DIFFERENT HOLOGRAMS EXPOSED WITH SHORT INTERVAL

BACKGROUND OF THE INVENTION

Holographic interferometry has within a short time gained great importance for measuring the deformation of mechanic structures, for example in HNDT (Holographic Non-Destructive Testing).

The invention has the object of making it possible to produce interferometric information on the condition of an object, comprising exposure within short interval of light-recording material, for example photographic plates, films, thermoplastics, photoresistant or dichromatic materials and the like, hereinafter called hologram plates, and reconstruction of the exposed information on the hologram plates, by using a light source and a reference beam at the exposure in a known manner.

In the following, the principle of producing holograms is dealt with very briefly. It requires a light source with light of sufficient coherence, preferably a laser. It further requires a photographic material with high resolution which is sensitive to said light. A characteristic feature of the holographic technique is that no lens is required between the object and the photographic material. The light from a laser is caused to diverge and to light the object, from which the light in the form of more or less diffuse light (object beams) is thrown against the photographic emulsion, which usually is applied to a base consisting of glass or plastic film, the "hologram plate". At the same time, the hologram plate, receives additional light, the reference beam, preferably from the same laser. The reference beam preferably is produced by dividing light from the laser into several beams by some known optic method, for example a normal mirror, semi-transparent mirror. The hologram plate is exposed by causing the laser light to light for a certain time the object and the reference mirror, i.e. the mirror yielding the reference beam. The hologram plate thereafter is developed in a known manner, and when the plate thereafter again is lighted with laser light from about the same direction and with the same divergence as the reference light during the exposure, an image of the object is obtained, i.e. the hologram is reconstructed. This image is virtual, implying that it can be seen only through the hologram plate. When the direction of the light is entirely reversed, a real image is obtained, implying that the image can be caught on a screen. The virtual image has a fully three-dimensional effect and shows parallax, i.e. the object can be observed from different directions. When the object during exposure is reproduced on the hologram plate by means of a lens, a hologram image of the object is obtained at the reconstruction in the plane of the hologram plate. This image can be reconstructed also with usual incoherent light, for example from a light bulb. One condition for producing the hologram is that the spatial filter, object, reference mirror and hologram plate during the exposure do not move so much that the interference lines are erased which are formed when the object beam and reference beam meet on the hologram plate. A further condition is that the hologram plate has sufficient resolution for being able to reproduce these interference lines.

In double exposure interferometery first an exposure of the holographic plate is made. Thereafter the deformation to be examined is effected, for example by loading the object, whereafter a further exposure is made. It is important in this connection that the holographic set-up is so stable that neither the optic components, the hologram plate nor the object of examination have changed their positions between the two exposures. A movement of only some μm is sufficient to destroy the measurements.

After the development and fixing of the hologram plate, when the plate is lighted by laser light (reconstruction), a three-dimensional image of the object measured is obtained, which image seems to be covered with interference lines, the light components of which connect the points, which have carried out between the exposures a movement of an integer number of half light-wave lengths (when the lighting, observation and movement have taken place along the same line).

In "real-time hologram interferometry," first one exposure is made, whereafter the hologram plate is developed and fixed and, finally, again is placed with high accuracy in the position which it occupied at the exposure. When no component of the set-up has been dislocated, no interference lines are seen when observing the object through the hologram plate. As soon, however, as the object is deformed, for example by being loaded, interference lines arise when observing the object through the hologram plate. This method, thus, has the advantage that the deformation of the object measured can be measured immediately, without requiring a further development of the hologram plate. This method, thus, makes it possible to study many different load cases within a short time. One disadvantage of the method is that the holographic set-up must remain in its position for the entire period required for carrying out the measurements and evaluations.

In "sandwich-holography," the different exposures are carried out on different hologram plates, which at the evaluation (reconstruction) are positioned adjacent one another in the form of a "sandwich". Prior to the first exposure two hologram plates are positioned in the same holder, one plate behind the other so, that the photographic emulsions do not lie adjacent each other. Prior to the second exposure these plates are replaced by two new ones, which are positioned in exactly the same manner. After all plates have been developed and fixed, they are placed together in pairs from the respective exposure, so that the plate having been foremost at the respective exposure also is foremost at the reconstruction. A thorough report on this technique is made in Applicant's articles "Sandwich Hologram Interferometry: a New Dimension in Holographic Comparison", Applied Optics, vol. 13, No. 9, September 1974, pages 2019-2025, and "Sandwich Hologram Interferometry. 2: Some Practical Calculations", Applied Optics, vol. 14, No. 4, April 1975, pages 981-984.

Advantages of the "sandwich-hologram" are that even after the experimental equipment has been dismantled, the following possibilites remain:

1. Different load combinations can be studied by the combination of different hologram plates.
2. The effect of the total movement of the object can be eliminated, so that small local deformations can be studied in spite of large movement of the object.
3. The interference lines can be manipulated so as to yield maximum information.
4. Deformation signs (forward or rearward( can be obtained.

Holographic Interferometry with double-pulsed laser

One of the difficulties of conventional holography is its sensitivity to movements and vibrations. One way of avoiding this problem is to hold the exposure times so short that during the exposure a movement of sufficient size (more than about 0.25 μm) cannot take place. For this purpose, for example a Q-switched ruby laser with pulse lengths of 20 ns and a distance between the pulses of about 1 ms is used.

It is possible by this method to reproduce even rapidly moving details. However, in the measurement of deformation by means of double pulsing, the condition arises that, by movement of the object between the two pulses, a great number of interference lines are added to the line pattern which had arisen owing to the deformation. As a result it may be impossible to carry out the measurements because the lines arising due to the movements of the object being examined conceal entirely the desired information on the deformation of the object.

Therefore, it is desirable to store holographic information from double pulsed exposure on different hologram plates, for example in the same way as in normal sandwich-holography with all its advantages.

In the usual sandwich-method, however, it is necessary that the two hologram plates, which have been subjected to the first exposure, are replaced by two new ones in precisely the same position occupied by the two previous plates, before the second exposure can be carried out. It seems impossible that this can be carried out during a time shorter than one millisecond.

There already exists, however, a method of achieving some of the advantages mentioned above with reference to the sandwich-method.

At the first exposure, a reference beam is used which prior to the second exposure is exchanged for another reference beam from a new direction. This requires rapid light switches, for example Pockel-cells, which during the time between the pulses change beams. At the reconstruction, two beams are used simultaneously, the angles and divergence of which must coincide with high accuracy with those of the two reference beams used previously. This requires a stable optic set-up during the reconstruction. In view of the results hereby achieved, these methods could not be applied generally, but only with special set-ups, for example for "focused image holography" where the image at the exposure is focused by a lens on the hologram plate. In this connection, reference can be made to Robert K. Erf, Holography in a Factory Environment, which publication resulted from the conference "Engineering Uses of Coherent Optics", Strathclyde April 1975, particularly pages 41–45.

SUMMARY OF INVENTION

The present invention renders it possible to holographically reproduce very rapidly moving details, thereby eliminating the disadvantages involved with previously known methods for this kind of reproduction. The invention also eliminates the need for a synchronization signal and electric-optic switches as well as the need for any special reconstruction apparatus, and the reconstruction can take place a conventional manner by a single beam.

The novelty of the invention is that the exposure takes place on hologram plates, which during and between the exposures move in such a manner, that the movement does not destroy the recording of holograms, but implies such a size of plate movement between the exposures, that these exposures are recorded in different portions of the plates. In order to restrict the portion of the plates being used at each exposure, a screen with a gap (gaps) of suitable shape is placed in front of the plate.

Exposure can take place on two plates positioned one ahead of the other, as in the case of usual sandwich-holography. Subsequent to development and fixing, the plates are re-positioned, one ahead of the other, in the same way as at the first exposure, whereafter they are displaced relative to each other until the recording of the first exposure coincides with the recording of the second one. Thereby interference lines are obtained in the reconstructed hologram image, which lines show the movement and deformation of the object examined. By varying the plate displacement, the lines resulting from the movement of the plates can be eliminated, so that only lines due to local deformation remain. By measuring the movement and direction of the hologram displacements, the movement and deformation of the object can be calculated plate as to size and sign. By especially calculated plate displacements; the gradient of the object movements can be determined by the derivate of the line density or by line inclination, the latter or which can be read with substantially higher accuracy. In this way, for example the bending stresses of the object can be calculated, and areas with maximum load easily can be discovered. By additional displacements of the plates, furthermore, other combinations of hologram recordings can be carried out, when the laser has emitted more than two pulses.

In order not to have to start the movement of the plates by a special trigger pulse, and in order to avoid great acceleration forces on the hologram plates, the plates can perform a continuous rotary movement prior to, during and subsequent to the exposures. The axis of rotation then is located perpendicularly to the surface of the hologram plates so that some portion of the plates always is located behind the gap in the screen.

BRIEF DESCRIPTION OF DRAWINGS

The invention is described in greater detail by way of an embodiment, with reference to the accompanying drawings, in which FIG. 1 is a schematic diagram of the basic components, of the present invention.

FIG. 2 is an exploded view of the rotary holgram plate holder.

FIG. 3 is an exploded view of an evaluation apparatus (reconstruction apparatus) for the holograms.

DETAILED DESCRIPTION OF PREFERRED EMBODIMENT

In the schematic diagram in FIG. 1, the object to be studied is assumed to consist of a rotating cylinder 1, which is lighted by a ruby laser 2, the light beam of which first passes through a negative lens 3 for spreading the light. Within the light beam from the laser 2, a reference mirror 4 is positioned as close as possible to the object in order to produce a reference beam which is directed to the hologram. To the side of the object 1 a reference surface 5 is positioned. The components described above and their set-up are per se not new in the art of holographic interferometry and, therefore, do not require a more explicit explanation.

For recording the rotating object 1, as previously indicated, movable hologram plates are used, which are designated by 6 and 7 and clamped one after the other in a rotating hologram holder 8, which is driven by an electric motor 9.

In front of the hologram plates 6 and 7 a screen 10 is positioned which is provided with one or more gaps.

The hologram holder 8 as well as the screen 10 located in front thereof are shown in greater detail in FIG. 2. The motor 9 drives the hologram holder 8, which is provided with three point supports (not shown), against which the inner plate is directed in parallel with the holder plane and perpendicularly to the axis of rotation. The guide pins 11 fix the plates 6, 7 in lateral direction, and two spring-loaded stop members 12 press the plates against said guide pins. A black surface 13 on the holder 8 absorbs the light passing through the hologram plates. The plates 6, 7 have such a position on the holder 8 that the centrifugal force at the rotation presses the plates against the three guide pins 11.

In front of and closely adjacent the plates 6 and 7 the screen 10 is located. The screen 10 is provided with a gap opening 14 which is shown in triangular form.

The evaluation apparatus (FIG. 3) comprises two detachable portions 15 and 16, each of which carries a rotary circular holder 17 and, respectively, 18 which in a fixed manner hold the respective hologram plate 6, 7. The plates are held in the circular holders 17, 18 so that the common axis of rotation for the holders coincides with the previous axis of rotation of the hologram plates (at the exposure). The distance between the plates also corresponds to the distance at the exposure.

The holder 17 can be rotated for coarse adjustment, while the holder 18 can be rotated by means of a fine adjustment screw (not shown). The holder 18 can be rotated against the three rolls 19–21, which also can be displaced radially with precision in order to render vertical and lateral displacement of the hologram 7 relative to the hologram 6 possible.

For joining together the portions 15, 16 guide pins 22 and locking screws 23 are used.

Exposure takes place in such a way, that the two hologram plates 6, 7 located in the holder 8 are rotated about an axle perpendicular to the surface of the plates. In front of the plates, the screen 10 with the gap or gaps is positioned substantially in parallel with the radius of rotation. The reference beam, gap, object and axis of rotation of the plate shall be located to the greatest possible extent in the same plane.

After two or more pulses from the laser have exposed the hologram plates 6, 7, the plates are released and developed. Thereafter the two plates 6, 7 are positioned in the holders 17, 18 in the evaluation apparatus and thereafter so rotated relative to each other, that the exposures from two different pulses coincide and interference lines arise on the hologram image of the object. The reconstruction beam should be identical to the greatest possible extent with the reference beam during the exposure in question, with respect to angle, divergence and wave length. From the position in which the interference lines can be seen on the object, but not on fixed surfaces (reference surface 5) in the hologram image, the plates then can be displaced further in different directions for manipulating the interference lines. The manipulation also can take place by angularly rotating the hologram plates joined together relative to each other, as described in the literature on sandwich holography. In FIG. 3, the two exposures are indicated by shaded triangles on the holograms.

The invention is directed to the principle of a new method of holographically reproducing a rapidly movable object. The above description, therefore, covers only examples of components which suitably can be applied to the working of the invention. In the following a calculation of the rotation speed of the hologram plates and of the size of the gap is illustrated.

| | |
|---|---|
| Exposure time (t) | 24 nsec |
| Time between pulses (T) | 0.5 msec |
| Minimum distance between interference lines on the hologram plate (d) | $\dfrac{\lambda}{2 \sin\alpha}$ |
| Greatest angle between laser beams lighting the hologram plate (2α) | 45° |
| Distance between the exposures on the plate (D) | |
| Permissible maximum movement of the plate surface during exposure | $\dfrac{d}{4}$ |
| Permissible maximum speed of the plate | v |
| Distance from utilized area on the plate to the rotation axis: R | 4 cm |
| Rotation speed r.p.m. | n |

$$V = \frac{\lambda}{t \times 8 \sin\alpha} = \frac{0{,}6328 \times 10^{-6}}{24 \times 10^{-9} \times 8 \times 0{,}383} = 8{,}6 \text{ m/sec}$$

$$n = \frac{\lambda \times 60}{\times 8 \times \sin\alpha \times 2\pi \times R} = 2{,}054 \text{ r.p.m.}$$

In this case, thus, a maximum permissible number of revolutions of about 2000 r.p.m. is obtained, whereby the separation between the exposures is $$V \times T = 8.6 \times 0.5 \times 10^{-3} = 4.3 \text{ mm}$$

When the separation between the recordings on the hologram plate is 2.23 mm, the gap in the screen also should be given this width, so that the two exposures can utilize a maximum surface of the hologram plate without covering each other.

When a greater exposed surface is desired, primarily the influence of 2α can be reduced by so placing the reference beam in relation to the object beam that the interference lines being formed substantially are located in parallel with the direction of movement of the plate, i.e. perpendicularly to the radius. This is obtained when the reference beam, gap, object and rotation axis of the plate all are located in the same plane. By positioning the reference beam in this plane and, besides, holding the angle between object beam and reference beam small, the angle giving rise to interference lines perpendicular to the direction of movement of the plate is determined only by the sight angle of the object. A practical minimum value for this angle can be sin 2α=0.1 (i.e. an object of the size 0.1×0.1 m at about 1 m distance). With the value sin 2α=0.1 instead of α=45°, a maximum rotation speed of 7.523 r.p.m. and a minimum gap width (D) of 15.77 mm are obtained.

When this gap width is not sufficient or when a much shorter time interval (T) between the pulses is desired, for example at high object speeds, the gap in the screen can be replaced by a number of gaps, each with the width D and with the distance D from each other. The gaps shall be substantially in parallel with each other and to the greatest possible extent perpendicular to the movement of the hologram plates.

The term hologram plate or plates is to be understood as photographic material, such as photographic plates, films thermoplastics, photoresistant or dichromatic material and the like, suitable for use in the present system. The invention therefore, is not to be regarded as restricted to this term in its narrowest sense.

What I claim is:

1. In an interferometer for measuring the deformation of an object, said interferometer including a light source for directing light on the object, a reference beam and two hologram plates positioned closely adjacent one another, one in front of the other and rigidly connected to each other, the method comprising:

moving both said hologram plates during and between exposures;

exposing both said hologram plates at the same time, each of said hologram plates being exposed in a short time interval to light reflected by the object and said reference beam to thereby obtain exposures on different portions of said hologram plates due to the predetermined movement of said hologram plates between exposures; and reconstructing the exposed image on said hologram plates by displacing said hologram plates relative to each other so that the surfaces of the forward hologram plate exposed by the first pulse cover the surfaces of the rearward hologram plate exposed by the second pulse, or vice versa, to thereby produce interference lines in the hologram image which correspond to the object.

2. A method according to claim 1 wherein the displacement of said hologram plates during reconstruction is obtained by rotation about the same axis about which said hologram plates rotated during exposure.

3. A method according to claim 2 wherein said hologram plates are displaced to the position where they yield the desired interference lines and the displacement is measured for evaluating the deformation of said object.

4. A method according to claim 1 further comprising the step of restricting the size of the short time interval exposures on said at least one hologram plate by positioning a fixed screen having at least one aperture therein in front of said hologram plate to thereby obtain exposures on different portions of said hologram plate.

5. A method according to claim 4 wherein said hologram plates are continuously rotated prior to and during the exposures, and the axis of rotation is located perpendicularly to the surface of said hologram plates and is positioned so that always some portion of said hologram plates is located behind said aperture in said screen.

6. A method according to claim 5 wherein the reference beam is given such an angle that the interference lines on said hologram plates have a direction substantially in parallel with the direction of movement of said hologram plates relative to said aperture.

7. A method according to claim 6 wherein a suitable direction of the interference lines is obtained by positioning the reference beam, gap, object and axis of rotation of said hologram plates in the same plane.

8. A method according to claim 5 wherein the angle of the reference beam and the visual angle of the object are chosen so that the distance between the interference lines on said hologram plates is as great as possible.

9. A method according to claim 4 wherein said fixed screen has a plurality of apertures substantially perpendicular to the direction of movement of said hologram plates, the width of said plurality of apertures being such that the different exposures fall on different surfaces of said hologram plates and have a distance relative to each other which is equal to the width of said apertures.

10. In an interferometer for measuring the deformation of an object, said interferometer including a light source for directing light on said object and a reference beam, the improvement comprising:

a first hologram plate;

a second hologram plate positioned closely adjacent said first hologram plate, said first and second hologram plates being rigidly connected to each other;

holding means for holding said first and second hologram plates in a position in which each of said hologram plates is exposed in a short time interval to light reflected by the object and said reference beam, said holding means comprising rotating means for rotating said hologram plates to thereby obtain short time interval exposures on different portions of said hologram plates.

11. In an interferometer according to claim 10, the improvement further comprising a fixed screen positioned between said hologram plates and the object, said screen having at least one aperture for restricting the size of the exposure on said two hologram plates to thereby obtain short time interval exposures on different portions of said two hologram plates.

12. In an interferometer according to claim 11, said fixed screen including a plurality of apertures.

13. In an interferometer according to claim 11, wherein said reference beam, said aperture, said object and the axis of rotation of said hologram plates are positioned in the same plane.

* * * * *